(12) United States Patent
Friend-Douglass

(10) Patent No.: US 7,785,167 B2
(45) Date of Patent: Aug. 31, 2010

(54) TOY ANIMAL FOR USE WITH CHILD TRANSPORTATION

(76) Inventor: Patricia Friend-Douglass, 28 Ridge Blvd., Port Chester, NY (US) 10573

( * ) Notice: Subject to any disclaimer, the term of this patent is extended or adjusted under 35 U.S.C. 154(b) by 362 days.

(21) Appl. No.: 11/575,957

(22) PCT Filed: Sep. 26, 2005

(86) PCT No.: PCT/US2005/034484

§ 371 (c)(1),
(2), (4) Date: Mar. 23, 2007

(87) PCT Pub. No.: WO2006/036913

PCT Pub. Date: Apr. 6, 2006

(65) Prior Publication Data

US 2008/0054704 A1    Mar. 6, 2008

Related U.S. Application Data

(60) Provisional application No. 60/613,149, filed on Sep. 24, 2004.

(51) Int. Cl.
*A63H 33/00* (2006.01)

(52) U.S. Cl. .................. 446/227; 446/268; 446/369; 297/181

(58) Field of Classification Search .......... 446/26, 446/28, 29, 227; 297/181, 467, 482; 280/751
See application file for complete search history.

(56) References Cited

U.S. PATENT DOCUMENTS

| | | | | |
|---|---|---|---|---|
| 1,390,502 A | * | 9/1921 | Clouser | 297/276 |
| 2,127,020 A | * | 8/1938 | Carlson | 297/423.19 |
| 4,268,037 A | * | 5/1981 | McKinley et al. | 273/359 |
| 4,333,642 A | * | 6/1982 | Adams | 446/28 |
| 4,595,618 A | * | 6/1986 | Caringer | 428/100 |
| 4,695,092 A | * | 9/1987 | Hittie | 297/219.12 |
| 4,921,460 A | * | 5/1990 | Lin | 446/385 |
| 4,973,106 A | * | 11/1990 | Strovinskas | 297/482 |
| 4,975,987 A | | 12/1990 | Teachout et al. | |
| 4,989,888 A | * | 2/1991 | Qureshi et al. | 280/30 |
| 5,000,712 A | * | 3/1991 | Curry, Sr. | 446/26 |
| 5,316,515 A | * | 5/1994 | Hyman et al. | 446/28 |
| 5,507,678 A | * | 4/1996 | Chiang | 446/369 |
| 5,560,680 A | * | 10/1996 | Salvador et al. | 297/256.15 |
| 5,656,994 A | * | 8/1997 | Heninger | 340/457.1 |
| 6,142,575 A | * | 11/2000 | Patterson | 297/482 |

(Continued)

*Primary Examiner*—Eugene Kim
*Assistant Examiner*—Urszula M Cegielnik
(74) *Attorney, Agent, or Firm*—Nolte Nolte & Hunter; Christopher Garvey

(57) ABSTRACT

A toy animal for use with forward-facing toddler seat 7, for placement on an adult seat of transportation such as a motor vehicle. The toy animal has a body 2. The body 2 has a rear 16 with a vertical slot 4 near the rear of the body. The slot 4 extends from a top 4a of the rear of the body to a bottom 4B of the rear of the body. The slot 4 is of sufficient size to allow a bottom portion of a restraint, such as a buckle assembly 6 of a shoulder harness 11, to pass vertically through the slot 4, and locate the toy 2 on the child safety seat 7. Latching the buckle assembly 6 secures the toy 2 and a child to the forward-facing toddler seat 7.

2 Claims, 7 Drawing Sheets

U.S. PATENT DOCUMENTS

| | | | |
|---|---|---|---|
| 6,881,118 B2 * | 4/2005 | Klick, Jr. | 446/26 |
| 7,311,578 B2 * | 12/2007 | Stanley et al. | 446/26 |
| 7,410,403 B1 | 8/2008 | Altschul | |
| 2004/0077273 A1 * | 4/2004 | Klick, Jr. | 446/268 |

* cited by examiner

G. 2

US 7,785,167 B2

TOY ANIMAL FOR USE WITH CHILD TRANSPORTATION

CROSS REFERENCES TO RELATED APPLICATIONS

This application is a US National Stage Application of a pending PCT Application US 05/34484 filed with the RO/US on Monday 26 Sep. 2005, published as WO 2006/036913; taking priority from U.S. Provisional Application 60/613, 149, filed 24 Sep. 2004.

BACKGROUND OF THE INVENTION

1. Field of the Invention

The present invention is a toy animal for use with child car seats and strollers. It is particularly useful for child car seats that the US Department of Transportation (DOT) calls "child restraint systems" (CRSs) or "child safety seats", and has had various regulations, definitions and descriptions dating from before the priority document of this application.

The present invention is most particularly suited for use with child safety seats that the DOT calls "forward-facing toddler seats", such seats having a five-point harness as part of a child restraint system. Forward-facing toddler seats are secured to the adult car seats by adult seatbelts, or by another DOT approved strap system called LATCH (lower anchors and tethers for children).

2. Related Art

WO 9526791 A1 (Youn) 12, Oct. 1995 refers to a toy having a horizontal slot for receiving a conventional seat belt, said toy positioned to be hugged to the child's chest. Youn's slot extends from side to side, rather than from top to bottom. Youn would not function with most currently made seatbelt shoulder harness combinations, nor with child's car seat harness restraints. Youn does not disclose a conventional child's car seat which is a forward-facing toddler seat. Youn cannot function as disclosed with a conventional child's car seat, which child's car seat is secured to a seat in a modern car by the car's seatbelt.

DETAILED DESCRIPTION OF PREFERRED EMBODIMENTS

Other objects and features of the present invention will become apparent from the following detailed description considered in connection with the accompanying drawings. It should be understood, however, that the drawings are designed for the purpose of illustration only and not as a definition of the limits of the invention.

Figure 1:
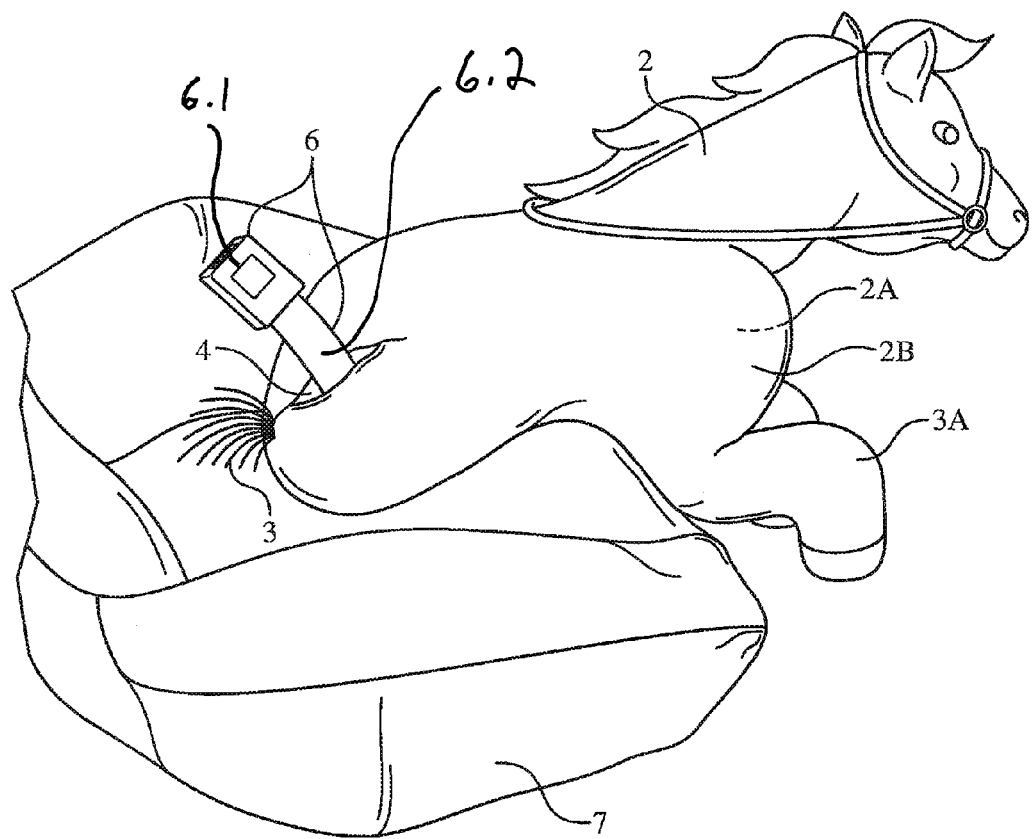
FIG. 1 is an oblique view of the toy of the present invention and a car seat, specifically a forward-facing toddler seat meeting the DOT requirements as of Sep. 24, 2004.

The present invention comprises a toy animal 2, as shown in FIG. 1. The toy is preferably stuffed. The stuffing is preferably of a soft, energy absorbing material 2A that would not contribute to injury in an accident, and might serve a padding function to absorb energy and impact of a loose child or flying object. It is preferably surfaced in a plush or fur like fabric 2B. The toy may be any fabric, but is preferably a soft fabric.

The animal is preferably a rideable animal, such as a horse, but may be any other sort of animal, as whimsey permits. The hind legs and tail of the animal have been omitted, or can be tucked under, or made vestigially small, such as tail 3. In the case of a four legged animal, such as a horse, the fore-legs 3A would best be included.

In the case of a two-legged animal, such as an ostrich, the two legs would best be included.

Figure 2:
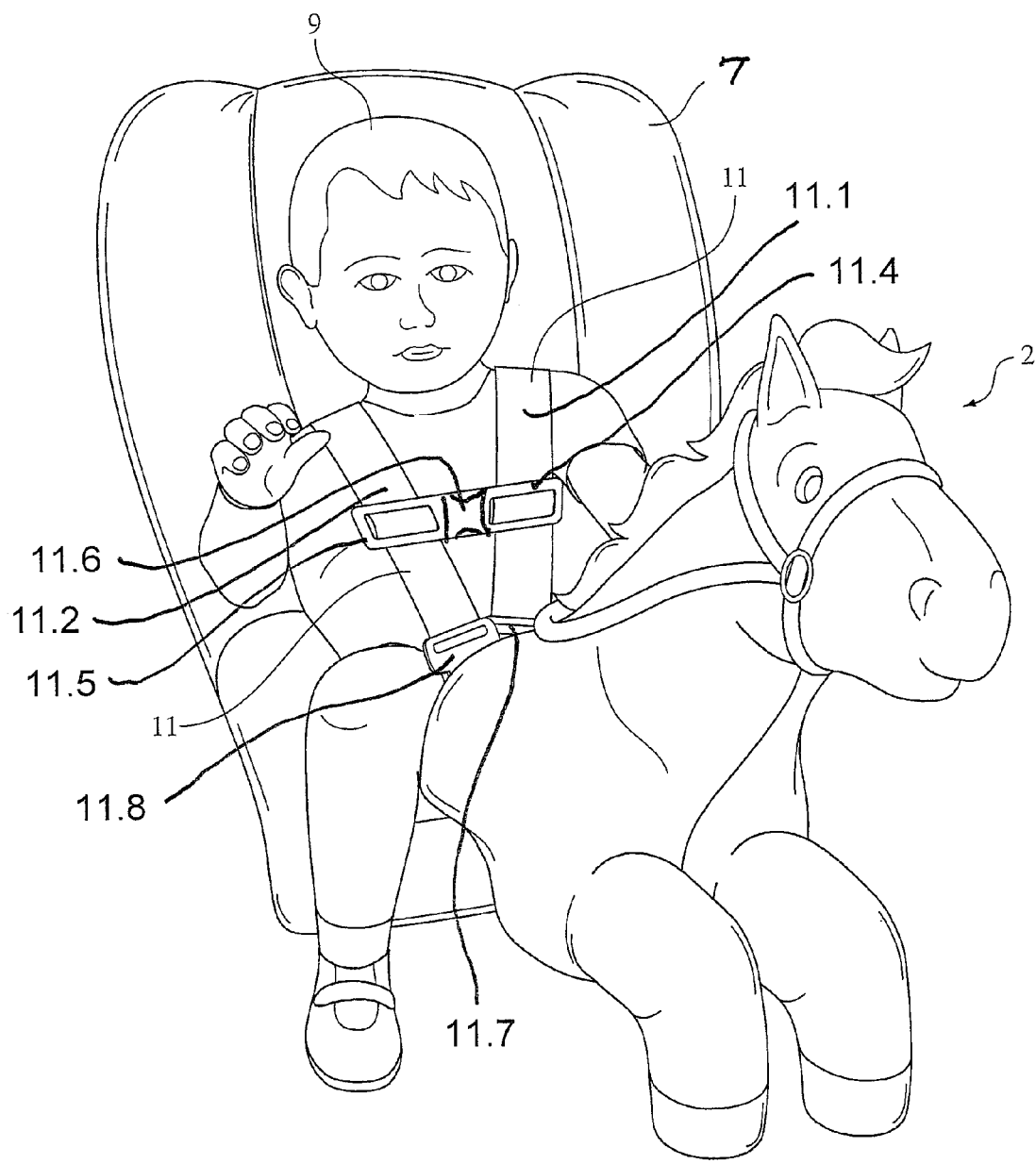
FIG. 2 is a similar oblique front view.
Figure 3:
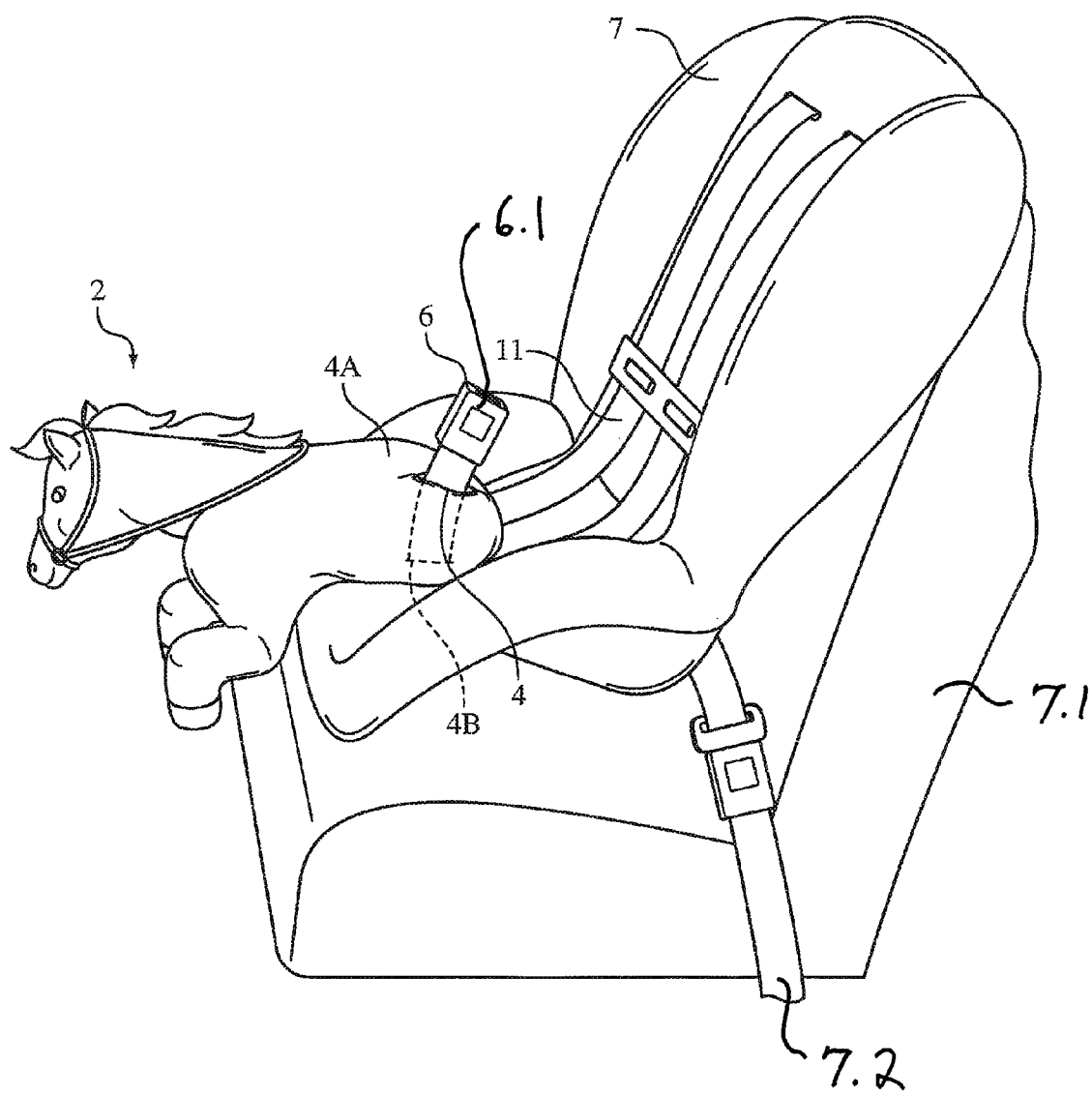
FIG. 3 is a side view of the toy and a car seat.
Figure 4:
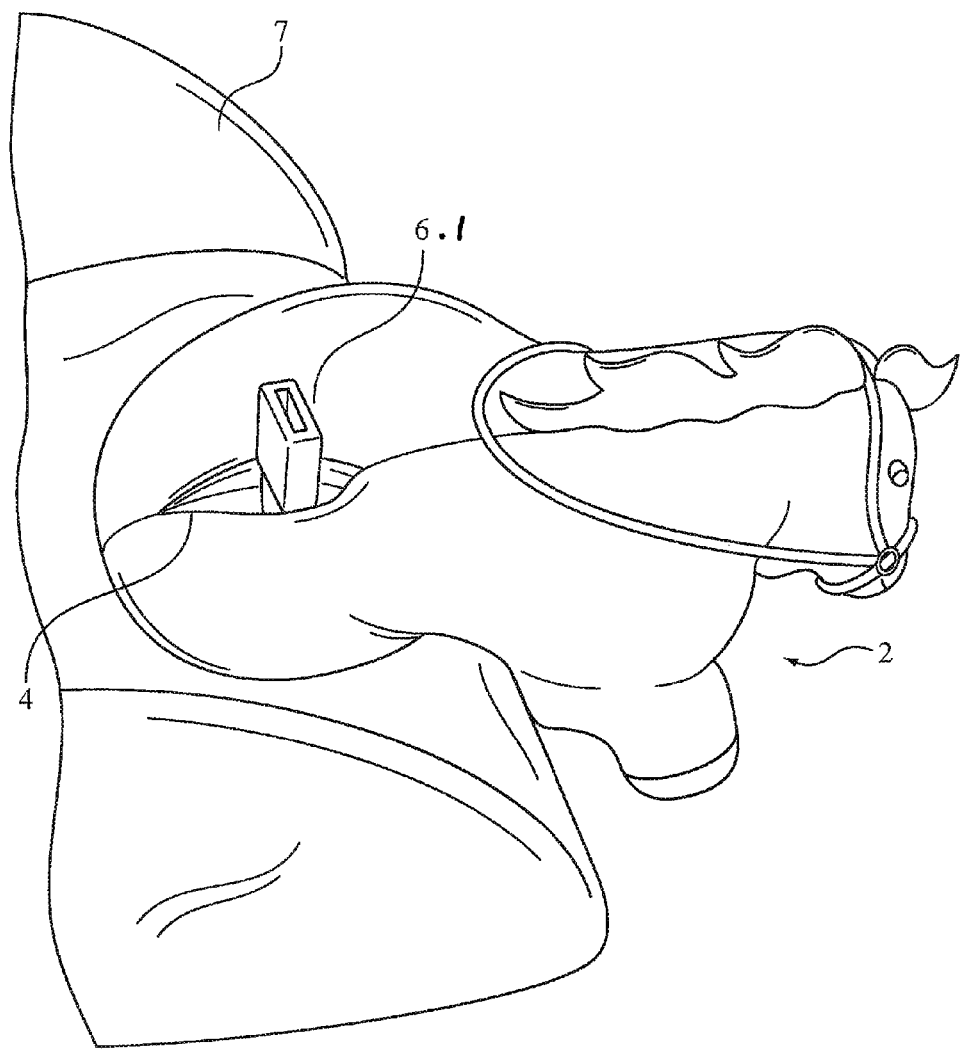
FIG. 4 is an oblique rear view of the present invention.

The animal is specifically adapted to be used with a child's car seat, such as the Britax Marathon car seat 7 shown in FIGS. 2 through 4, which the Department of Transportation (DOT) refers to as a "Child Restraint System" (CRS) or a "Child Safety Seat", specifically a type which the Department of Transportation (DOT) refers to as a "forward-facing toddler seat" as of our provisional filing date on Sep. 24, 2004. A Child Restraint System is required by most state laws for children between certain ages and sizes. As is known in the art, such a forward-facing toddler seat is to be secured on top of the standard adult car seat 7.1 (FIG. 3) by:

the adult seatbelt 7.2, or a newer system referred to by DOT as LATCH (lower anchors and tethers for children), not shown, whenever a child is transported in a car. All forward-facing toddler seats can be secured to an adult seat 7.1 by straps such as seatbelts 7.2, but only newer toddler seats and newer cars are equipped with the LATCH system of straps and anchors. Child restraint system (CRS) designs vary according to the size of the child they are designed to restrain, the direction the child should face, the type of internal restraining system, and the method of installation. Forward-facing toddler seats 7 are designed to be secured atop to the vehicle seat 7.1, using the vehicle safety belt 7.2 (SB) or LATCH (lower anchors and tethers for children) system if available. A slot 4 is provided at the back of the animal, slot 4 passing vertically through the animal from top surface 4A to bottom surface 4B [FIG. 3] of the animal's body 2, so that a restraint or restraining device such as a buckle assembly 6 for a shoulder harness 11 (FIG. 2) can pass vertically through slot 4. The shoulder harness is called by the DOT a "five-point restraint".

Harness 11 comprises a pair of straps 11.1 & 11.2.

Left strap 11.1 passes from an anchor point above the child's left shoulder; through a left half chest buckle 11.4.

Right strap 11.2 passes from an anchor point above the child's left shoulder; through a right half chest buckle 11.5.

Left half chest buckle 11.4 is buckled to right half chest buckle 11.5 to form chest buckle 11.6, which is then vertically adjusted on straps 11.2 & 11.3 to safely lie across the toddler's chest at armpit level. Left strap 11.1 terminates at buckle insert 11.7 and at the left hip attached to buckle 6.1.

Figure 6:
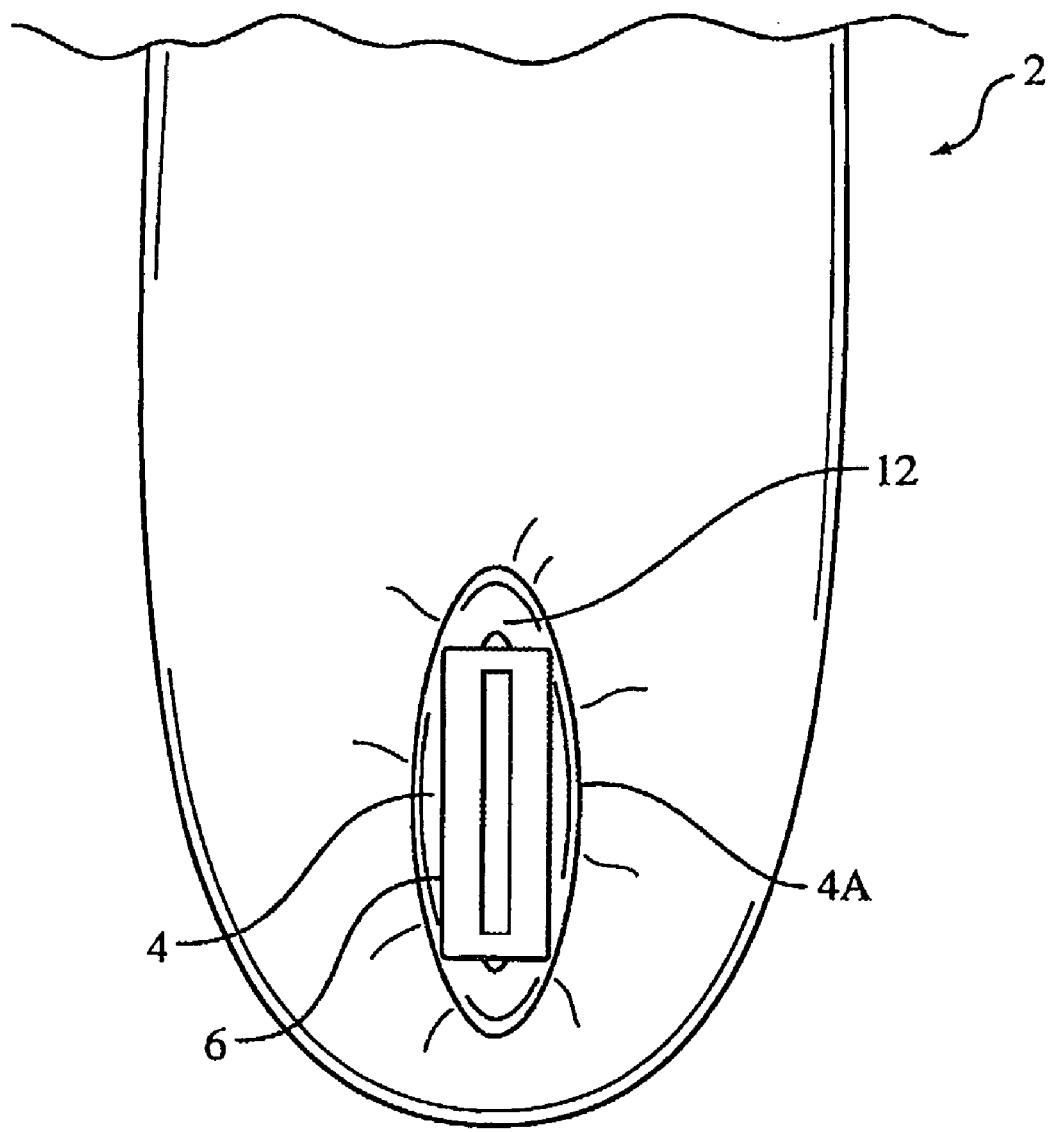
FIG. 6 is a plan view of the rear of the toy animal.
Figure 7:
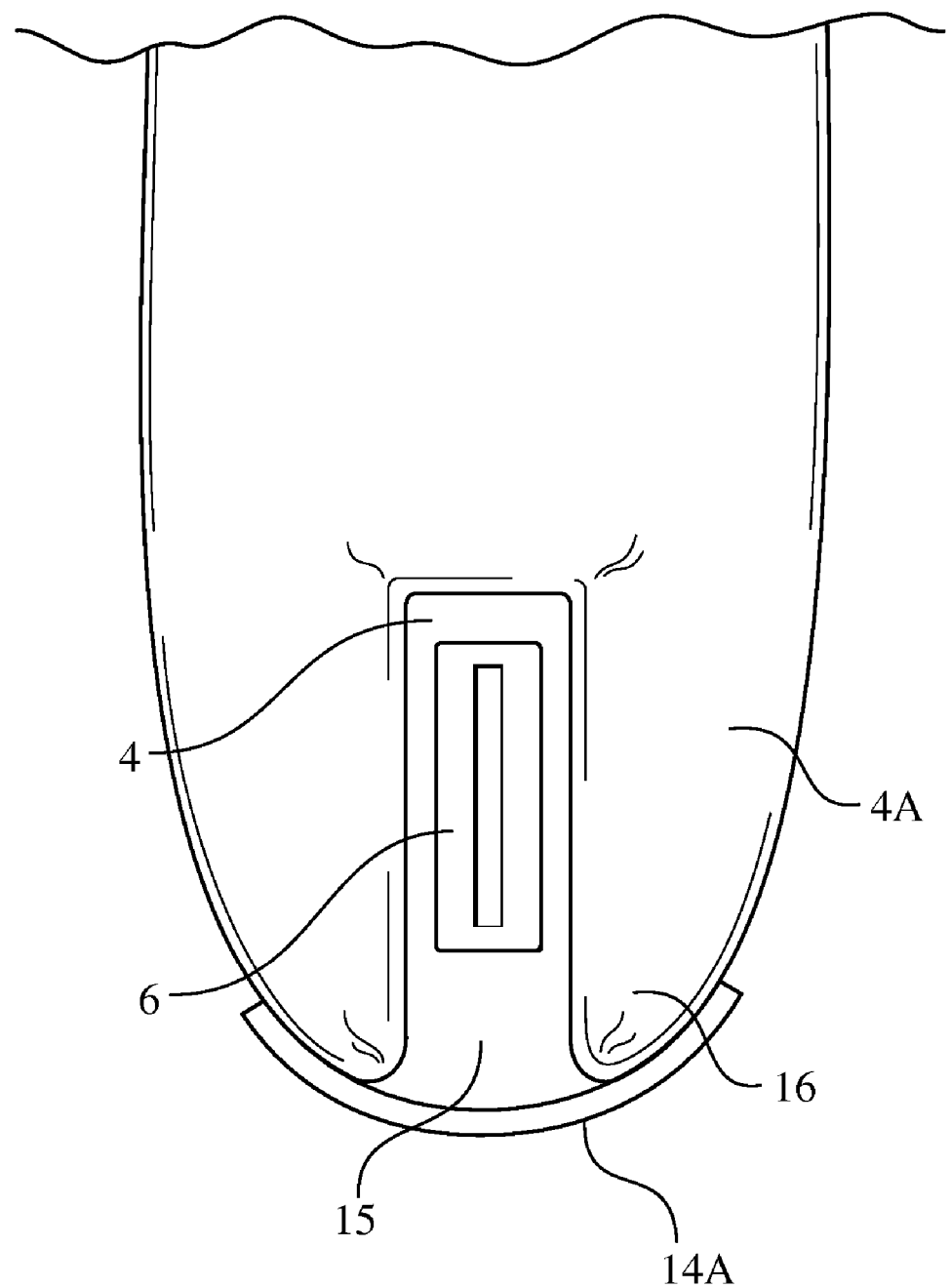
FIG. 7 is a plan view of an alternate embodiment of said rear.

Right strap 11.2 terminates at buckle insert 11.8 at the left hip attached to buckle 6.1. Buckle inserts 11.4-11.5, insert into a buckle 6.1 attached to bottom strap 6.2. which together comprise lower buckle assembly 6. Lower buckle assembly 6 can be threaded through the slot 4 (FIG. 1). The slot 4 is either enclosed in plan view, around a hole 12 (FIG. 6), or closeable, as by a velcro strap 14A or other closure across the opening 15 in the toy's rear 16. The closed slot 4 locates the toy animal 2 at the front of the seat 7 (FIGS. 1-4). The inventor has learned, by using this device with the slot enclosed around the hole 12 as in FIG. 6, that it achieves surprising results:

A. The horse serves to support the buckle assembly 6 forward above the seat, so that the child does not get placed on the buckle lying flat on the seat of the child's seat. This obviates the need to reach uncomfortably under the child for buckle 6.1.

B. As shown in FIG. 2, the plush horse body also provides insulation between the child's legs, which are often bare in summer, and what can be a very hot metal buckle 6.1 in summer.

C. The horse spreads the child's legs, spacing them apart from the possibly hot buckle 6.1.

Thus the toy protects the child from being burned by hot metal buckle 6.1.

The buckle assembly 6 is then latched by its buckle 6.1 to five-point harness 11 to secure child 9 and toy animal 2 in their respective positions on child restraint system 7. Horse 2 then gives the illusion of being ridden by the child sitting in the car seat 7 or stroller 8 (FIG. 5).

FIG. 2 shows the child 9 astride the toy 2 in a car seat 7 with a five-point harness 11 fastened. The bottom buckle assembly 6 (FIG. 1) of the shoulder harness 11 (FIG. 2) is threaded vertically through the slot 4 in the horse. Buckle assembly 6 comprises buckle 6.1 and strap 6.2.

Figure 5:
FIG. 5 is a front oblique view of the present invention as used with a child's stroller.

FIG. 5 shows another embodiment in which the child is in a stroller 8. The restraint 17 comprises a Y-shaped cloth panel 18 comprising buckles 14. Buckles 14 and restraint panel 18 are threaded through slot 4 in the toy 2 and are pulled through the slot 4 leaving in the slot 4 a stem 20 of the "Y" shaped panel 18. When the buckles 14 are fastened to the stroller 8, the child 9 and the toy animal 2 are retained in place and provide the illusion of the child riding an animal.

Accordingly, while a few embodiments of the present invention have been shown and described, it is to be understood that many changes and modifications may be made thereunto without departing from the spirit and scope of the invention.

I claim:

1. A method of giving a child in a removably transportable child's car safety seat, specifically a forward-facing toddler seat, an illusion that said child is riding an animal, said method comprising the following steps:

securing by strap means, the forward-facing toddler seat, upon a standard adult seat of a motor vehicle;

said forward-facing toddler seat having a sitting surface;

providing a toy animal having a forward facing body;

providing a vertical slot at a rear of said toy animal, said vertical slot passing vertically from a top surface to a bottom surface of the animal's forward facing body;

placing the toy animal facing forward on said sitting surface of said forward-facing toddler seat;

threading a buckle assembly vertically up through said vertical slot to locate the toy animal to the said forward-facing toddler seat, and to bias the buckle assembly forward and away from an aft portion of the sitting surface that the child's bottom will be placed upon, of the forward-facing toddler seat;

placing the child in the forward-facing toddler seat;

buckling the left and right straps of the five-point harness around the child to the buckle, to secure the child and toy animal to said forward-facing toddler seat, with a front of the animal extending from between the child's legs, to give the illusion of the child riding the animal.

2. A method according to claim 1, having an additional final step of:

buckling the left chest strap of the left strap to the right chest strap of the right strap with the chest strap buckle.

\* \* \* \* \*